(12) United States Patent
Yin et al.

(10) Patent No.: US 7,215,732 B2
(45) Date of Patent: May 8, 2007

(54) METHOD AND SYSTEM FOR CT RECONSTRUCTION WITH PRE-CORRECTION

(75) Inventors: Zhye Yin, Schenectady, NY (US); Jong Chul Ye, Daejon (KR); Francis Howard Little, Cincinnati, OH (US); Forrest Frank Hopkins, Scotia, NY (US); Michael Chunhe Gong, Chicago, IL (US); Yanfeng Du, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 296 days.

(21) Appl. No.: 10/955,623

(22) Filed: Sep. 30, 2004

(65) Prior Publication Data

US 2006/0067461 A1 Mar. 30, 2006

(51) Int. Cl.
*A61B 6/00* (2006.01)
(52) U.S. Cl. .............................. 378/5; 378/98; 378/98.8
(58) Field of Classification Search ............. 378/4–20, 378/98, 98.8, 901
See application file for complete search history.

(56) References Cited

U.S. PATENT DOCUMENTS

| | | | | |
|---|---|---|---|---|
| 5,099,505 A | * | 3/1992 | Seppi et al. | 378/65 |
| 5,692,507 A | * | 12/1997 | Seppi et al. | 600/407 |
| 5,774,521 A | * | 6/1998 | Close et al. | 378/62 |
| 5,878,108 A | * | 3/1999 | Baba et al. | 378/98.4 |
| 6,067,342 A | * | 5/2000 | Gordon | 378/19 |
| 6,285,799 B1 | * | 9/2001 | Dance et al. | 382/261 |
| 6,345,113 B1 | | 2/2002 | Crawford et al. | 382/131 |
| 6,377,654 B1 | | 4/2002 | Willems et al. | 378/59 |
| 6,421,409 B1 | | 7/2002 | Paulus et al. | 378/4 |
| 6,928,182 B1 | * | 8/2005 | Chui | 382/131 |
| 2003/0007601 A1 | * | 1/2003 | Jaffray et al. | 378/65 |
| 2003/0185339 A1 | | 10/2003 | Heumann et al. | 378/19 |
| 2005/0105693 A1 | * | 5/2005 | Zhao et al. | 378/210 |
| 2005/0286749 A1 | * | 12/2005 | De Man et al. | 382/131 |
| 2006/0002504 A1 | * | 1/2006 | De Man et al. | 378/4 |

FOREIGN PATENT DOCUMENTS

| | | | |
|---|---|---|---|
| EP | 0487243 | 5/1992 | |
| EP | 1072861 | 1/2001 | 378/59 |

(Continued)

OTHER PUBLICATIONS

The Point Spread Function of Sprial CT, Schwarzband et al., Institute of Physics Publishing, Physics in Medicine and Biology, Nov. 2, 2005.*

(Continued)

*Primary Examiner*—Courtney Thomas
*Assistant Examiner*—Alexander Taningco
(74) *Attorney, Agent, or Firm*—Penny A. Clarke; Patrick K. Patnode (57) ABSTRACT

A method for reconstructing image data from measured sinogram data acquired from a CT system is provided. The CT system is configured for industrial imaging. The method includes pre-processing the measured sinogram data. The pre-processing includes performing a beam hardening correction on the measured sinogram data and performing a detector point spread function (PSF) correction and a detector lag correction on the measured sinogram data. The pre-processed sinogram data is reconstructed to generate the image data.

22 Claims, 7 Drawing Sheets

FOREIGN PATENT DOCUMENTS

WO        WO 0157795        8/2001

OTHER PUBLICATIONS

Three-dimensional Point Spread Function Measurement of Cone-beam Computer Tomography System by Iterative Edge-Blurring Algorithm, Chen et al., Institute of Physics Publishg, Physics in Medicine and Biology, Apr. 29, 2004.*

Quantitative and Qualitative Evaluation of Geometric Deconvolution of Distortion in Limited-View Computer Tomography, Soble et al., IEEE Transactions on Biomedical Engineering, May 1985, vol. BME-32. No. 5.*

Francis Little, et al, "Iterative CT Reconstruction Method Using Multi-Modal Edge Information", U.S. Appl. No. 10/707,031, Filed Nov. 17, 2003.

P. J. La Riviere, "Penalized-likelihood sinogram restoration for CT artifact correction", Nuclear Science Symposium Conference Record, 2004 IEEE Rome, Italy, Oct. 16-22, 2004, Piscataway, NJ, USA, IEEE Oct. 16, 2004, pp. 3303-3307.

J. Hsieh, "Computed Tompgraphy", SPIE Press, Bellingham, Washington, USA, ISBM: 0-8194-4425-1, 2003, pp. 39-43, figure 3.5, sec. 7.5.2, "Primary Speed and afterglow", pp. 201-206 and pp. 221-230.

I. A. Elbakri, "Statistical Reconstruction Algorithms for Polyenergetic X-ray Computed Tomography", 2003, PHD Thesis, University of Michigan, XP002359012, Sec. 6.2 , "Data preprocessing steps", sec. 6.3, "System model", pp. 113-120.

J. H. Siewerdsen et al., "Cone-beam computed tomography with a flat-panel imager: Effects of image lag", Medical Physics, American Institute of Physics, New York, vol. 26, No. 12, Dec. 1999, pp. 2635-2647.

EP Search Report 0525 5628, Dec. 14, 2005.

* cited by examiner

METHOD AND SYSTEM FOR CT RECONSTRUCTION WITH PRE-CORRECTION

BACKGROUND OF THE INVENTION

The present invention, relates generally to computed tomography (CT) systems, and more particularly to a CT industrial inspection system and method for generating high-resolution CT images using pre-correction techniques.

In present date industrial inspection processes, different types of measurement systems are available such as CT, coordinate measuring machines (CMM) and laser-based profilometry. Each inspection modality has its own advantages and disadvantages associated therewith. Modalities such as CMM and laser-based profilometry can measure external surfaces with high accuracy, but cannot measure internal features unless the part is cut open. To date, CT is one of the more versatile of the measurement/inspection systems for revealing both the internal and external structures of industrial parts in a non-destructive manner. The potential industrial applications of CT include reverse engineering, rapid prototyping, quality assurance, casting simulation & validation, tire development, first article inspection, ceramic porosity inspection, process validation, parts qualification and defect detection, to name a few. However, improved inspection accuracy of industrial CT is desirable, for widespread applications thereof.

For example in the area of reverse engineering, CT has not been optimized for capturing detailed external surface features, which can be crucial for capturing the design intent. The factors affecting CT accuracy in this regard include (among other aspects) beam-hardening, partial volume effect, scattering and off-focal radiation. Thus, in order to improve CT inspection accuracy, more effective methods are needed for removing the effects of these artifacts. In the area of CT image reconstruction, filtered backprojection (FBP) is a common technique because of its fast computation and ease of implementation. However, because FBP oversimplifies the CT data acquisition into an ideal Radon transform (i.e., Fan Beam transform, cone beam transform or any other transform depending on the particular acquisition geometry), the reconstructed image suffers from artifacts such as beam hardening and partial volume as discussed above.

In order to improve image quality, iterative reconstruction techniques have been employed to correct system imperfections such as focal spot size, detector point spread (PSF) function, detector time lag, non-linear partial volume error, scatter, beam hardening etc. Iterative reconstruction techniques are based on different mathematical principles, such as the statistical approach of maximum likelihood, and the least squares approach, for example. These techniques permit the incorporation of a dedicated forward model of the data acquisition. Typically, in an iterative reconstruction approach, the reconstructed image is incrementally updated using the differences between the initial projection measurements and the forward projection model.

Although iterative reconstruction techniques significantly improve image quality, the computational complexity associated with iterative reconstruction is highly intensive, as these techniques require multiple applications of computationally expensive forward and backprojections. Hence, iterative methods are not yet widely used in CT. Accordingly, it is desirable to be able to provide a technique for capturing both internal and external features of an object to be inspected and a technique that improves the image quality of reconstructed images without a significant increase in computation time.

BRIEF DESCRIPTION OF THE INVENTION

Embodiments of the present technique address this and other needs. In one embodiment, a method for reconstructing image data from measured sinogram data acquired from a CT system is provided. The CT system is configured for industrial imaging. The method includes pre-processing the measured sinogram data. The pre-processing includes performing a beam hardening correction on the measured sinogram data and performing a detector point spread function (PSF) correction and a detector lag correction on the measured sinogram data. The pre-processed sinogram data is reconstructed to generate the image data.

In another embodiment, a CT system for reconstructing image data from measured sinogram data is provided. The CT system is configured for industrial imaging. The system includes an X-ray source configured to project polychromatic X-ray beams through an object and a detector configured to produce electrical signals in response to received X-ray beams from the source. The system further includes a system controller configured to process the electrical signals to generate the measured sinogram data. The system controller is further configured to pre-process the measured sinogram data. Pre-processing the measured sinogram data includes performing a beam hardening correction; a detector point spread function (PSF) correction and a detector lag correction on the measured sinogram data. The system controller then reconstructs the pre-processed sinogram data to generate the image data.

DETAILED DESCRIPTION OF SPECIFIC EMBODIMENTS

Disclosed herein, is a CT system configured for industrial imaging. As used herein, "industrial imaging" refers to the imaging of both the internal and external structures of industrial parts in a non-destructive manner. As will be appreciated by those skilled in the art, industrial X-ray CT provides rapid three-dimensional measurement for imaging both external and internal features. Disclosed herein, is a CT reconstruction method that provides for improved image quality, in which pre-correction techniques are applied to projection data measurements prior to image reconstruction. Thereby, a more accurately calculated image projection (or sinogram) is used to reconstruct the image of the object. In addition, the reconstruction method, in accordance with the present technique, achieves high resolution while reducing the reconstruction time.

Figure 1:
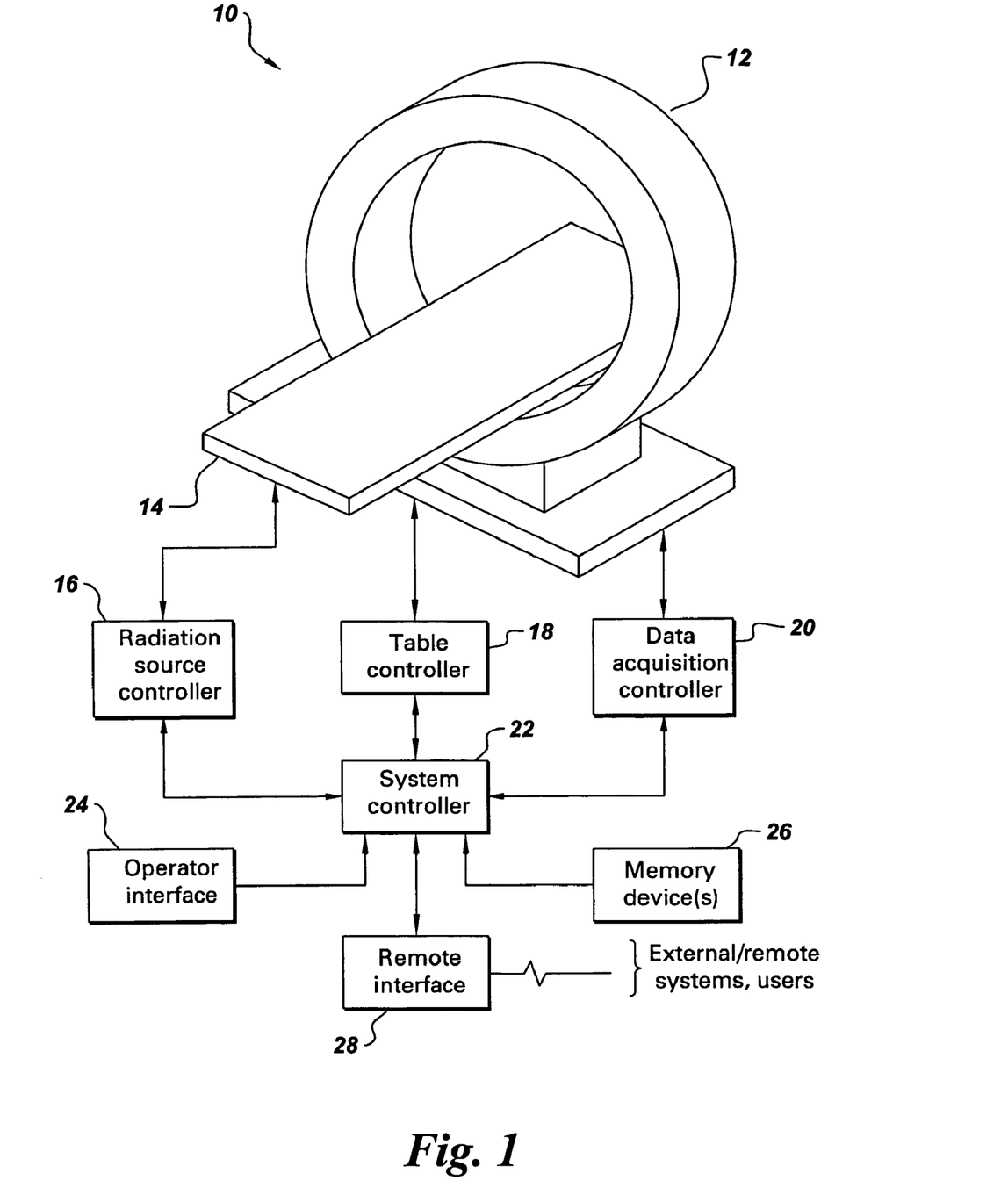
FIG. 1 is a diagrammatical representation of an exemplary CT system.

Turning now to the drawings, referring first to FIG. 1, a computed tomography (CT) system is illustrated and designated generally by reference numeral 10. In the illustrated embodiment, the computed tomography (CT) system 10 is designed to acquire, pre-process and reconstruct image data in accordance with the present technique as will be described in greater detail below. The CT system 10 includes a scanner 12. For the exemplary embodiment of FIG. 1, the scanner 12 is formed of a support structure and internally containing one or more stationary or rotational, distributed sources of X-ray radiation (not shown in FIG. 1) and one or more stationary or rotational digital detectors (not shown in FIG. 1). For the exemplary embodiment of FIG. 1, the scanner 12 is configured to receive a table 14 or other support for an object to be scanned. The table 14 can be moved through an aperture in the scanner 12 to appropriately position the subject in an imaging volume or scanning plane during imaging sequences.

For the exemplary embodiment of FIG. 1, the CT system 10 further includes a radiation source controller 16, a table controller 18 and a data acquisition controller 20, which may all function under the direction of a system controller 22. The radiation source controller 16 regulates timing for discharges of X-ray radiation which is directed from points around the scanner 12 toward a detector element on an opposite side thereof, as discussed below. In the case of stationary CT arrangements, the radiation source controller 16 may trigger one or more emitters in a distributed X-ray source at each instant in time for measuring multiple projection data. In certain arrangements, for example, the X-ray radiation source controller 16 may trigger emission of radiation in sequences so as to collect adjacent or non-adjacent measurements of projection data around the scanner 12. Many such projection data may be collected in an examination sequence, and data acquisition controller 20, coupled to detector elements as described below receives signals from the detector elements and processes the signals for storage and later image reconstruction. In configurations described below in which one or more sources are rotational, source controller 16 may also direct rotation of a gantry on which the distributed source or sources are mounted. Table controller 18, then, serves to appropriately position the table and subject thereon in a plane in which the radiation is emitted, or generally within a volume to be imaged. The table may be displaced between imaging sequences or during certain imaging sequences, depending upon the imaging protocol employed. Moreover, in configurations described below in which one or more detectors or detector segments are rotational, data acquisition controller 20 may also direct rotation of a gantry on which the detector or detectors are mounted.

For the exemplary embodiment of FIG. 1, system controller 22 generally regulates the operation of the radiation source controller 16, the table controller 18 and the data acquisition controller 20. The system controller 22 may thus cause radiation source controller 16 to trigger emission of X-ray radiation, as well as to coordinate such emissions during imaging sequences defined by the system controller. The system controller 22 may also regulate movement of the table 14 in coordination with such emission so as to collect projection data corresponding to volumes of particular interest, or in various modes of imaging, such as helical acquisition modes. Moreover, system controller 22 may further be configured to coordinate rotation of a gantry on which, either the source(s), detector(s), or both are mounted in the case of rotating CT geometries or arrangements. The system controller 22 also receives data acquired by the data acquisition controller 20 and coordinates storage and processing of the data. As will be described in greater detail below, in accordance with the present technique, the system controller 22 is configured to pre-process the projection data measurements. The projection data measurements are sometimes referred to as a sinogram. The pre-processing includes performing a beam hardening correction on the sinogram data and performing a detector point spread function (PSF) correction and a detector lag correction on the sinogram data. The system controller 22 is further configured to reconstruct the pre-processed sinogram data to generate the image.

It should be borne in mind that the controllers, and indeed various circuitry described herein, may be defined by hardware circuitry, firmware or software. The particular protocols for imaging sequences, for example, will generally be defined by code executed by the system controllers. Moreover, initial processing, conditioning, filtering, and other operations required on the projection data acquired by the scanner 12 may be performed in one or more of the components depicted in FIG. 1. For example, as described below, detector elements will produce analog signals representative of depletion of a charge in photodiodes positioned at locations corresponding to elements of the detector used for data acquisition. Such analog signals are converted to digital signals by electronics within the scanner, and are transmitted to the data acquisition controller 20. Partial processing may occur at this point, and the signals are ultimately transmitted to the system controller for further filtering and processing. In the same manner, image reconstruction may be accomplished by application specific integrated circuits residing in the system controller 22, by algorithms executed on the system controller 22, or by remote systems that can access the same data stored in memory device 26.

For the exemplary embodiment of FIG. 1, system controller 22 is also coupled to an operator interface 24 and to one or more memory devices 26. The operator interface may be integral with the system controller 22, and will generally include an operator workstation for initiating imaging sequences, controlling such sequences, and manipulating projection data acquired during imaging sequences. The memory devices 26 may be local to the imaging system, or may be partially or completely remote from the system. Thus, memory devices 26 may include local, magnetic or optical memory, or local or remote repositories for measured data for reconstruction. Moreover, the memory devices may be configured to receive raw, partially processed or fully processed projection data for reconstruction.

System controller 22 or operator interface 24, or any remote systems and workstations, may include software for image processing and reconstruction. Therefore, some or all of the image processing may be performed remotely by additional computing resources based upon raw or partially processed image data. As will be appreciated by those skilled in the art, such processing of CT projection data may be performed by a number of mathematical algorithms and techniques. A remote interface 28 may be included in the system for transmitting data from the imaging system to such remote processing stations or memory devices.

Figure 2:
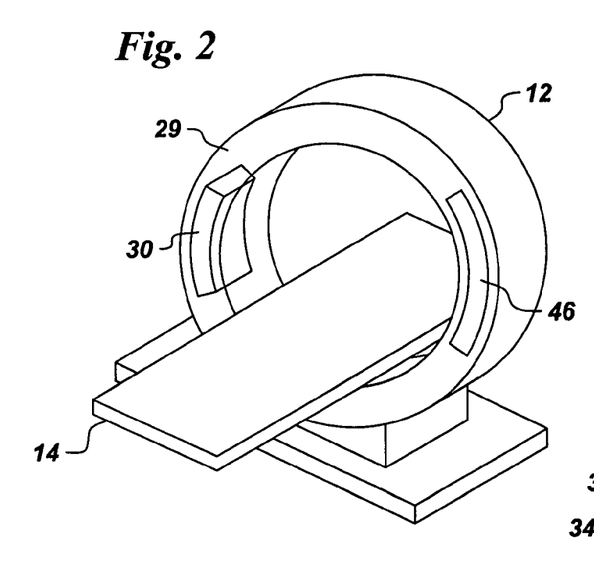
FIG. 2 is an illustration of the CT scanner, shown in FIG. 1, with an exemplary X-ray source and a detector array.

FIG. 2 is an illustration of the scanner 12, shown in FIG. 1, with an exemplary X-ray source and a detector array. Referring to FIG. 2, the scanner 12 includes a gantry 29. The gantry 29 is illustrated with a source of radiation 30, typically an X-ray tube, and a detector array 46. In a typical operation, the X-ray source 30 projects an X-ray beam toward the detector array 46. The detector array 46 is generally formed by a number of detector elements, which sense the X-rays that pass through and around an object of interest. Each detector element produces an electrical signal that represents the intensity of the X-ray beam at the position of the element at the time the beam strikes the detector. Furthermore, the gantry 29 is rotated around an object of interest so that a number of radiographic views may be collected by the system controller 22 shown in FIG. 1. Thus, an image or slice is computed which may incorporate, in certain modes, less or more than 360 degrees of projection data, to formulate an image. The image may be further collimated to desired dimensions, for example, using either lead shutters in front of the X-ray source 30 and different detector apertures. As will be appreciated by those skilled in the art, the collimator typically defines the size and shape of the X-ray beam that emerges from the X-ray source 30. Thus, as the X-ray source 30 and the detector 46 rotate, the detector 46 collects data of the attenuated X-ray beams.

Although in the present discussion reference is made to a CT scanning system in which a source and detector rotate on a gantry arrangement, it should be borne in mind that the present technique is not limited to data collected on any particular type of scanner. For example, the technique may be applied to data collected via a scanner in which an X-ray source and a detector are effectively stationary and an object is rotated, or in which the detector is stationary but an X-ray source rotates. Further, the data could originate in a scanner in which both the X-ray source and detector are stationary, as where the X-ray source is distributed and can generate X-rays at different locations as will be described in greater detail with respect to FIG. 3. Similarly, although generally circular scan geometries are discussed, other geometries may be envisioned as well.

Figure 3:
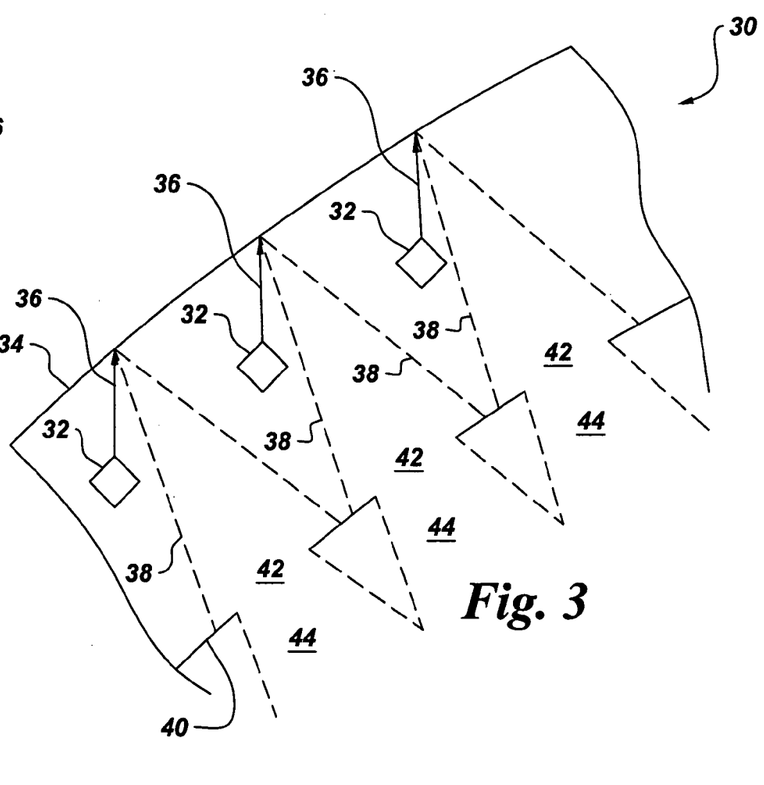
FIG. 3 is a diagrammatical representation of an exemplary distributed source for use with a system of the type illustrated in FIG. 1.

FIG. 3 is a diagrammatical representation of an exemplary distributed X-ray source of a type that may be employed in the CT system 10 of FIG. 1. As shown in FIG. 3, in an exemplary implementation, the distributed X-ray source 30 may include a series of electron beam emitters 32 that are coupled to radiation source controller 16 shown in FIG. 1, and are triggered by the source controller during operation of the scanner. The electron beam emitters 32 are positioned adjacent to a distributed target 34. Upon triggering by the source controller, the electron beam emitters 32 may emit electron beams 36 toward target 34. The target 34, which may, for example, be a tungsten rail or element, emits X-ray radiation, as indicated at reference numeral 38, upon impact of the electron beams. In reflection mode, X-rays are meant to be produced primarily on the same side of the target as where the electrons impact. In transmission mode, X-rays are produced at the opposite side of the target. The X-ray beams 38 are directed, then toward a collimator 40, which is generally opaque to the X-ray radiation, but which includes openings or apertures 42. The apertures 42 may be fixed in dimension, or may be adjustable. Apertures 42 permit a portion of the X-ray beams to penetrate through the collimator to form collimated beams 44 that will be directed to the imaging volume of the scanner, through the subject of interest, and that will impact detector elements on an opposite side of the scanner.

A number of alternative configurations for emitters or distributed sources may, of course, be envisaged. Moreover, the individual X-ray sources in the distributed source may emit various types and shapes of X-ray beams. These may include, for example, fan-shaped beams, cone-shaped beams, and beams of various cross-sectional geometries. Similarly, the various components comprising the distributed X-ray source may also vary. The emission devices may be one of many available electron emission devices, for example, thermionic emitters, carbon-based emitters, photo emitters, ferroelectric emitters, laser diodes, monolithic semiconductors, etc. Although a distributed source configuration has been discussed in detail here, any combination of one or more rotating-anode, stationary-anode, or distributed X-ray sources may be utilized in the CT system 10.

Figure 4:
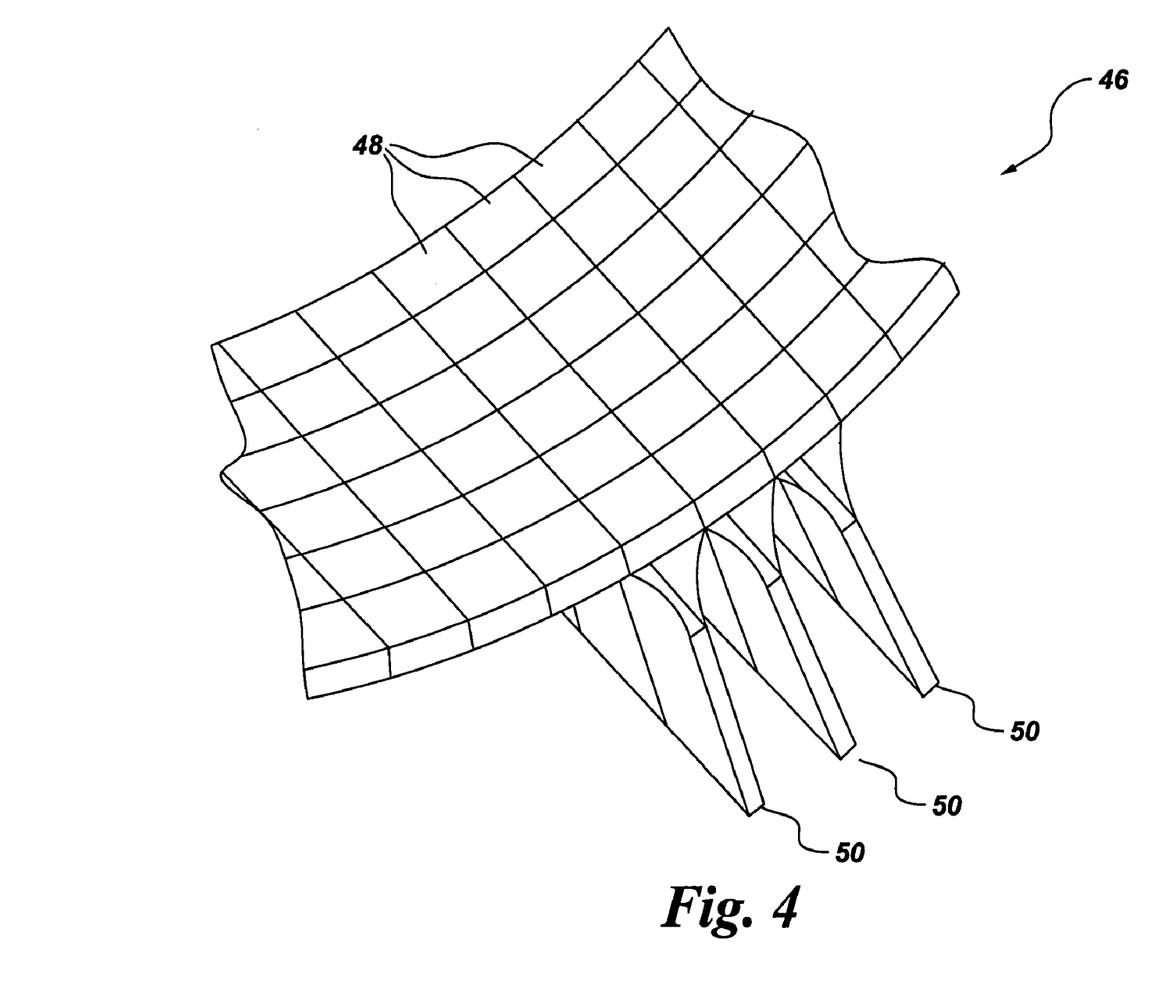
FIG. 4 is a diagrammatical representation of a portion of detector for use with the system illustrated in FIG. 1.

FIG. 4 is a diagrammatical representation of a portion of a detector that may be employed by the CT system 10 of FIG. 1. The detector arrangement may be generally similar to detectors used in conventional rotational CT systems. The detector may be extended around a greater portion or the entire inner surface of the scanner in certain embodiments. Each detector may be comprised of detector elements with varying resolution to satisfy a particular imaging application. In general, the detector 46 includes a series of detector elements 48 and associated signal processing circuitry 50. These detector elements may be of one, two or more sizes, resulting in different spatial resolution characteristics in different portions of the measured projection data. Exemplary detector elements include an array of photodiodes and associated thin film transistors. X-ray radiation impacting the detectors is converted to lower energy photons by a scintillator and these photons impact the photodiodes. A charge maintained across the photodiodes is thus depleted, and the transistors may be controlled to recharge the photodiodes and thus measure the depletion of the charge. By sequentially measuring the charge depletion in the various photodiodes, each of which corresponds to a pixel in the collected data for each acquisition, data is collected that indirectly encodes radiation attenuation at each of the detector pixel locations. This data is processed by the signal processing circuitry 50, which will generally convert the analog depletion signals to digital values, perform any necessary filtering, and transmit the acquired data to the system controller 22 of the imaging system 10 in FIG. 1 as described above. Although a detector configuration comprised of scintillation material and storage diodes is mentioned, any suitable detector for measuring X-rays may be used with the present technique.

Figure 5:
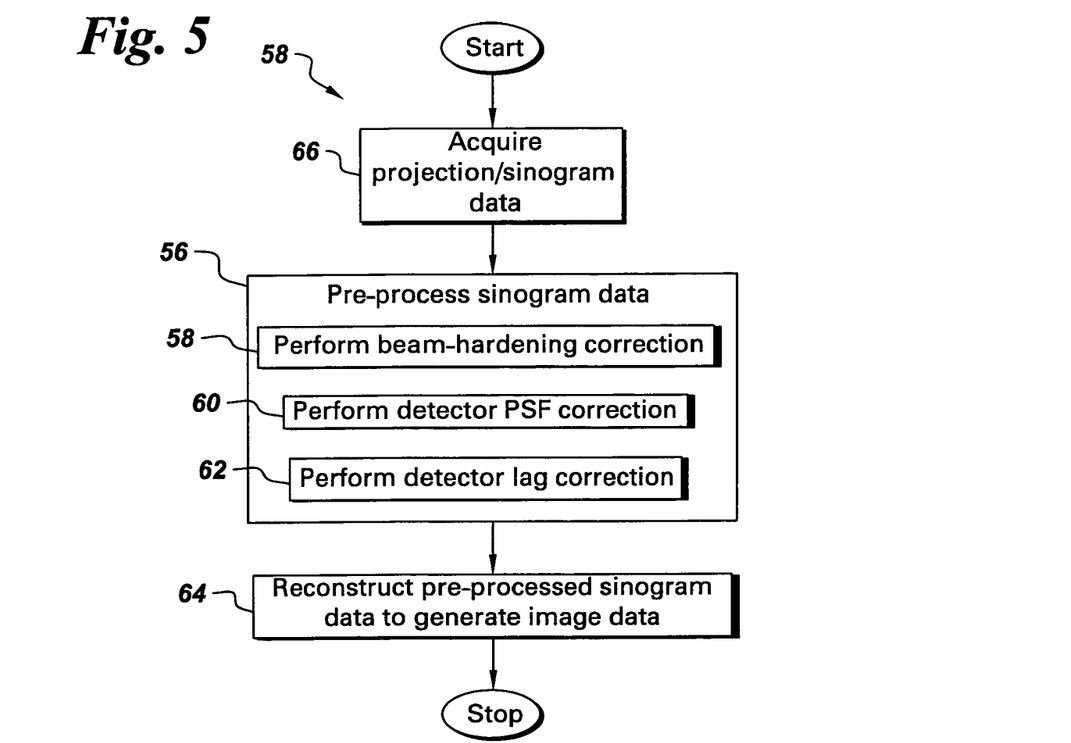
FIG. 5 is a flowchart depicting exemplary logic including exemplary steps for reconstructing image data from measured sinogram data acquired by the CT system of FIG. 1.

FIG. 5 is a flowchart 52 depicting exemplary logic including exemplary steps for reconstructing image data from measured sinogram data acquired by the CT system 10 of FIG. 1. In step 54, the projection data measurements are acquired from the CT system 10. As used herein, the term "projection data measurements" also refers to a sinogram. In step 56, the measured sinogram data is pre-processed. For the exemplary embodiment illustrated in FIG. 5, pre-processing the measured sinogram data in step 56 further includes performing a beam hardening correction on the measured sinogram data in step 58, performing a detector point spread function (PSF) correction in step 60 and performing a detector lag correction in step 62 on the measured sinogram data as will be described in greater detail below. In step 64, the pre-processed sinogram data is reconstructed to generate image data. In a specific embodiment of the present technique, a filtered backprojection technique is used to reconstruct the image data. The following paragraphs, describe the beam hardening correction process, the detector point spread function (PSF) correction process and the detector lag correction process in greater detail.

As will be appreciated by those skilled in the art, conventional X-ray sources for CT imaging typically comprise rotating anode tubes (or X-ray tubes) that possess polychromatic spectrums. That is, the X-ray photons emitted from such X-ray tubes do not all possess the same X-ray energy levels. Moreover, attenuation processes in matter are typically energy dependent. Non-uniform attenuation of different energies results in the preferential depletion of X-rays in energy ranges with higher attenuation coefficients. In general, X-rays in energy ranges that are more easily attenuated are referred to as soft X-rays while those in ranges that are more penetrating are referred to as hard X-rays.

Beam hardening is the process of selective removal of soft X-rays from an X-ray beam. As these X-rays are removed, the beam becomes progressively harder or alternatively more penetrating. The amount of beam hardening typically depends on the initial X-ray spectrum as well as on the composition of the material traversed. In general, for a pre-determined initial X-ray spectrum and tissue type, the process of beam hardening represents a monotonic increase in beam hardness as a function of material thickness traversed. As a result of beam hardening, the effective attenuation coefficient of a material depends on the thickness of material traversed. This effect causes beam-hardening artifacts in CT images. As will be appreciated, beam-hardening artifacts, if uncorrected, create a cupping effect, or a reduction of the reconstructed attenuation coefficient toward the center of the object being imaged.

Figure 6:
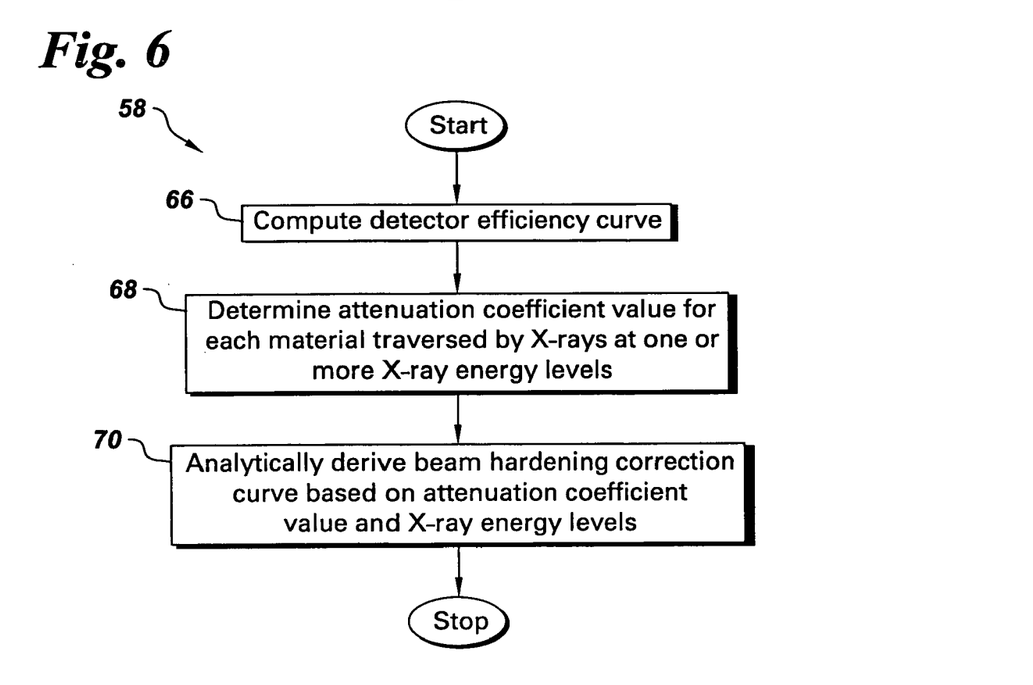
FIG. 6 is a flowchart depicting exemplary steps for performing beam-hardening correction.
Figure 7:
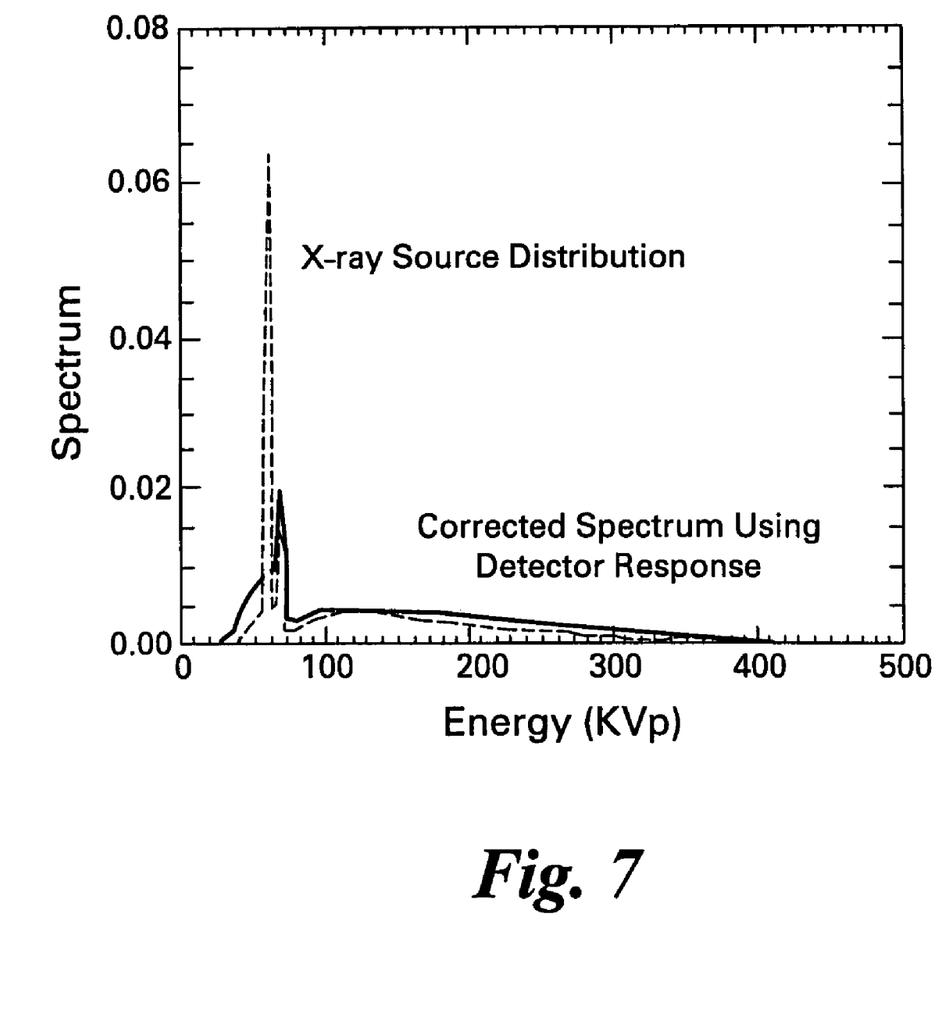
FIG. 7 is an illustration of an original X-ray source spectrum and a corrected X-ray source spectrum.

In order to appreciate the benefits provided by embodiments of the present technique, reference is made to FIG. 6 in which there is shown, a flowchart 58 depicting exemplary steps for performing beam-hardening correction. Referring to FIG. 6, in step 66, a detector efficiency curve associated with the CT system 10 of FIG. 1 is initially computed. Then, the computed detector efficiency curve is used to correct the X-ray source spectrum as described below. As will be appreciated by those skilled in the art, the X-ray source spectrum is a measure of the distribution of X ray intensity as a function of energy. The exact nature of the distribution depends on the manner in which the X-rays are generated. The X-ray spectrum for a given X-ray source may be obtained by measurement, from the X-ray source supplier or may be determined through simulation. Further, in accordance with the present embodiment, the detector efficiency curve is computed as follows:

$$d(E) = (1 - \exp(-\mu(E)\text{thkness}))E \quad (1)$$

where E is the energy dependent attenuation co-efficient for the detector material, thkness, is the thickness of the detector material and μ is the attenuation. The X-ray source spectrum is scaled by the detector efficiency curve, d(E) to obtain a corrected X-ray source spectrum. FIG. 7 is an illustration of an original X-ray source spectrum and the corrected X-ray source spectrum.

In step 68, an attenuation coefficient value for each material traversed by X-rays, at one or more X-ray energy levels is determined. In particular, the mass attenuation coefficient value, denoted by μ/ρ (where μ denotes the attenuation value and ρ denotes the density) is determined for each material. As will be appreciated by those skilled in the art, the mass attenuation coefficient μ/ρ and the mass energy absorption coefficient, denoted by $\mu_{en}/\rho$ are basic quantities used to compute the penetration and the energy deposition by photons (which may comprise, for example, X-rays, or bremsstrahlung) in biological, shielding and other such materials. In accordance with this embodiment, to correct beam hardening effects, the mass attenuation coefficients, μ/ρ, for each material is determined. Further, the mass attenuation coefficient μ/ρ at one or more energy levels is pre-computed based upon a material composition and an X-ray source profile as follows.

As will be appreciated by those skilled in the art, the mass attenuation coefficient μ/ρ of a compound or a mixture of elements may be calculated by taking the weighted sum of the mass attenuation coefficients for each element, where a weight is assigned according to the fraction of the element contributing to the compound. Then, the mass absorption co-efficient may be obtained using the formula:

$$\mu/\rho = \Sigma w_i(\mu_i/\rho_i) \quad (2)$$

where $w_i$ is the fraction by weight of the $i^{th}$ atomic constituent. Furthermore, as will be appreciated by those skilled in the art, the values for the mass attenuation co-efficient, $\mu_i/\rho_i$, and the mass energy-absorption coefficient, $\mu_{en}/\rho$, as a function of photon energy, for various elements may be pre-determined. In addition, the fractions by weight may also be pre-determined. In accordance with the present embodiment, to obtain the $\mu_i/\rho_i$ values at all the absorption edges of all constituent elements, interpolation is performed. For example, in the case of a constituent element such as liquid water, the composition of Helium (H) and Oxygen (O) have fraction by weights of 0.111898 and 0.888102 respectively. Accordingly, the corresponding mass attenuation co-efficient was water is computed as follows:

$$(\mu/\rho)_{water} = 0.111898(\mu/\rho)_H + 0.888102(\mu/\rho)_o \quad (3)$$

Figure 8:
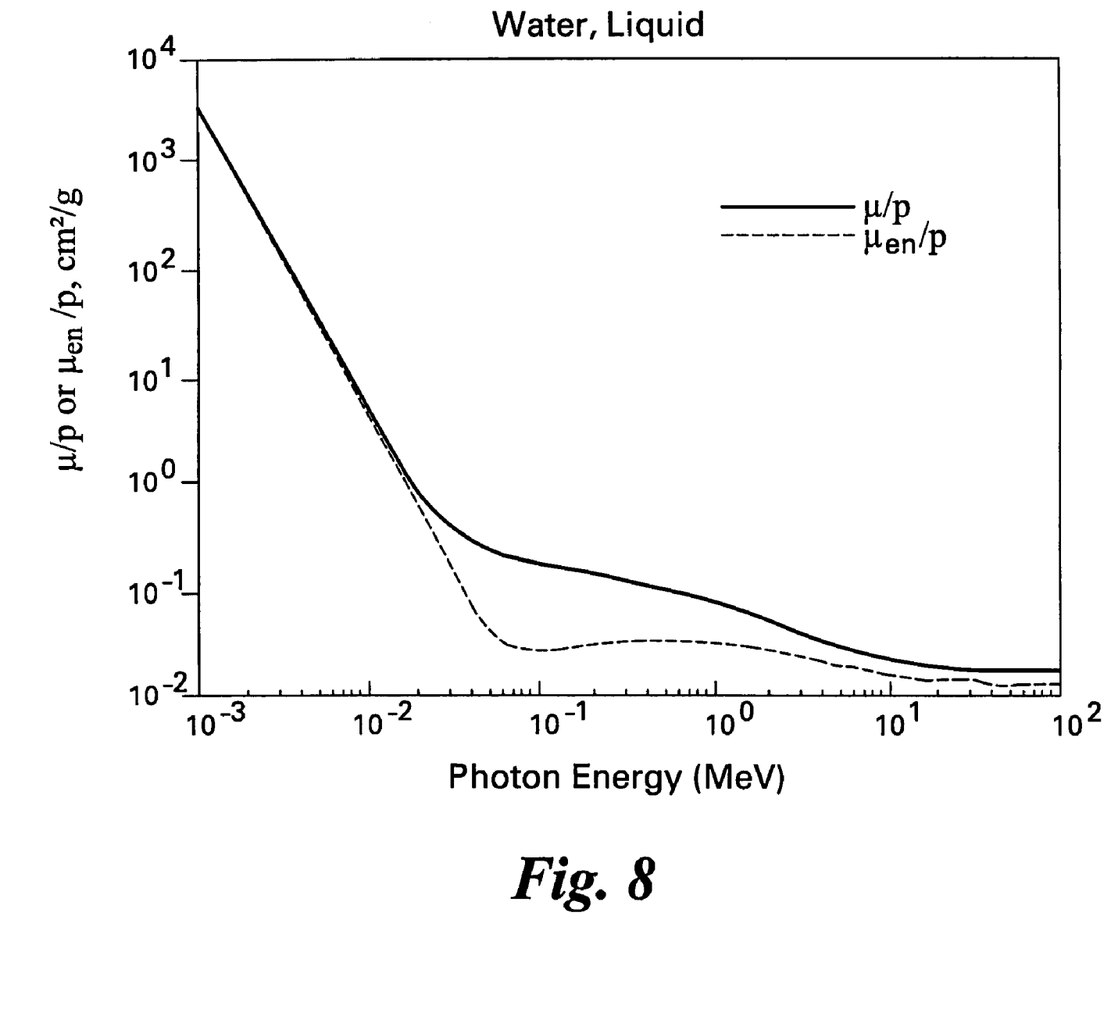
FIG. 8 is an illustration of the resultant mass attenuation coefficients obtained for a range of photon energies.

FIG. 8 is an illustration of the resultant mass attenuation coefficients for a range of photon energies. In particular, FIG. 8 indicates the mass attenuation coefficients $\mu_{water}$ and the mass energy-absorption coefficient ($\mu_{en}/\rho$) for water. To obtain the absorption co-efficients, $\mu_{water}$, for each X-ray energy level, the mass attenuation co-efficient $(\mu/\rho)_{water}$ is multiplied with its density. ($\rho_{water}=1$)

In step 70, a beam hardening correction curve is analytically derived based on the mass attenuation coefficient at the one or more X-ray energy levels and the corrected X-ray source spectrum obtained in step 66. More specifically, in accordance with the present embodiment, the beam hardening correction curve is analytically derived based on attenuation resulting from beam hardening for an X-ray path length. In particular, a summation of one or more intensity values over the one or more X-ray energy levels is performed, wherein each X-ray energy level has a corresponding mass attenuation coefficient as follows:

$$I = I_0 \int \Omega(E) e^{-\int \mu M(E) ds} dE \quad (4)$$

where Ω(E) represents the incident X-ray spectrum probability distribution, μM(E) denotes the absorption coefficients for a material M at an energy level E, and I0 and I represent the total incident and transmitted intensities, respectively. The beam hardening correction curve is then analytically generated based on the attenuation resulting from beam hardening and a linearized projection for the X-ray path length S by taking the logarithm of equation (4) as follows:

$$p_{bh}(S) = -\log(I/I_0) = -\log\left(\int_0^s \Omega(E) e^{-\int \mu M(E) ds} dE\right) \quad (5)$$

It may be noted that equation (5) is a non-linear equation. Since, the basic assumption for the filtered backprojection in CT reconstruction is the linear integral equation from Lambert-Beers law, the main purpose of the beam hardening correction is therefore to linearize equation (5), so that filtered backprojection may be applied to the sinogram data for reconstruction without artifacts. In one embodiment of the present invention, this is accomplished by performing a linearization around the effective absorption coefficient $\mu_{eff}$, as follows $$p = \int_0^S \mu_{eff} \, ds = \mu_{eff} S \tag{6}$$

where $\mu_{eff} = \mu(E_{eff})$ is computed for a user defined energy level $E_{eff}$. Since, both $p_{bh}$ and p are both functions of the path length for a fixed material, in accordance with embodiments of the present technique, a look up table between $p_{bh}$ and p is created by eliminating the path length S as an argument. Then, the corrected sinogram after beam hardening correction is given by:

$$p = p_{corrected} = \mu_{eff} S = \mu_{eff} p_{bh}^{-1} (\text{measured sinogram}) \tag{7}$$

Figure 9:
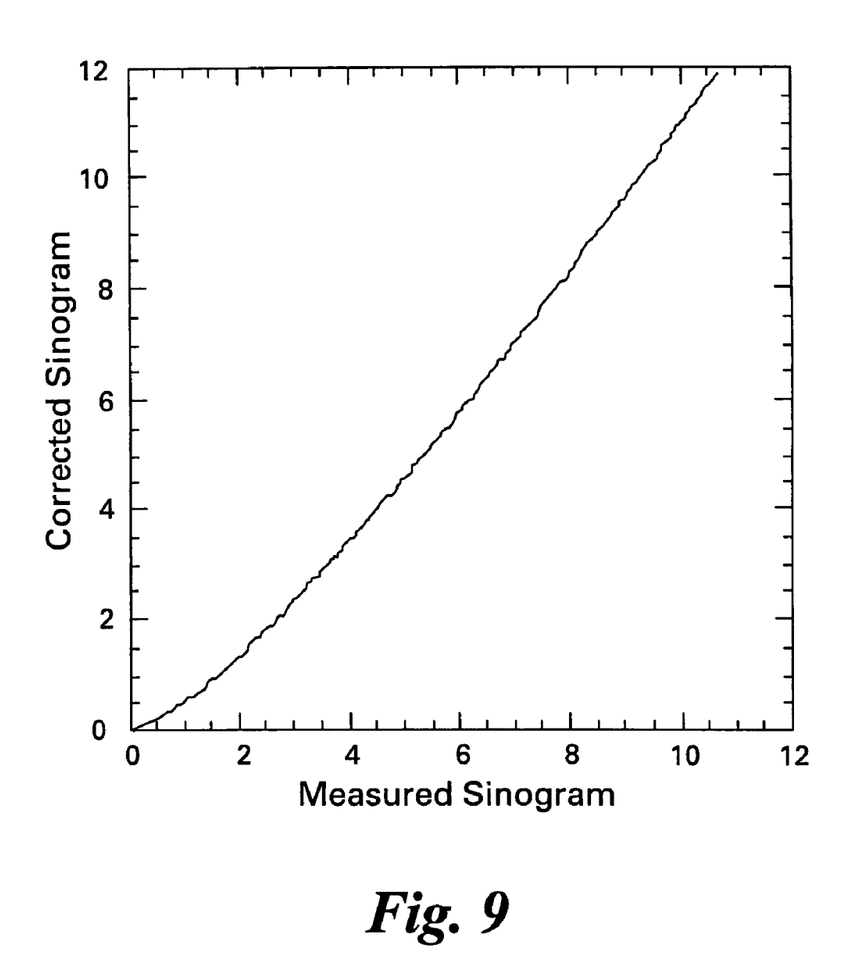
FIG. 9 is an illustration of an analytically derived beam hardening correction curve.

As may be observed from equation (7), the effective absorption co-efficient $\mu_{eff}$ is a scaling factor for the corrected sinogram, thereby enabling the choice of positive numbers for $\mu_{eff}$. Referring again to equations (5) and (6), the values of $p_{bh}$ and p are computed for each path length S. The integration in equation (5) is implemented as a summation so that equation (5) is a function of the path length S. After calculating the $p_{bh}$ and p values associated with all possible values of the path length S, either a look-up table or a plot as shown in FIG. 9 below, is generated, that includes all possible $p_{bh}$ and p pairs. The corrected sinogram is then generated when each attenuation value at the measured sinogram is replaced with the corresponding p value using this analytical relationship between p and $p_{bh}$.

FIG. 9 is an illustration of an analytically derived beam hardening correction curve. As indicated in FIG. 9, the measured sinogram value is represented by the x-axis and the corrected sinogram values correspond to the y-axis. In accordance with a particular embodiment, an optimization of the derived beam hardening correction curve is further performed based on one or more tuning parameters. Exemplary tuning parameters include an X-ray energy level value, an X-ray spectrum energy bin number, and a path length discretization number. As used herein, the X-ray spectrum energy bin number refers to the discretization level number associated with X-ray energy and the path length discretization number refers the quantization level number associated with the path length. For example, an X-ray spectrum energy bin number of 10 means that the total range of possible X-ray energies is divided in 10 subintervals. Similarly, a path length discretization number equal to 100 means that a path length range, such as, for example, between 0 cm to 100 cm would be quantized by 100, into 100 sub-intervals of 1 cm. A finer discretization of the X-ray spectrum energy bin number and the path length discretization number leads to a better simulation but requires more computational time. Further, optimization of the X-ray spectrum energy bin number and the path length discretization number may also be performed to achieve faster results with a smaller error.

Referring again to FIG. 5, in steps 60 and 62, a detector point spread function (PSF) correction and a detector lag correction is performed on the measured sinogram data. In accordance with the present technique, performing the detector PSF correction and the detector lag correction includes deconvolving the measured sinogram data along one or more detector rows and detector view directions as will be described in greater detail below.

As will be appreciated by those skilled in the art, the detector lag and the detector PSF typically cause azimuthal and radial blur in the image domain, respectively. The detector time lag occurs from the fact that if a solid-state detector is exposed to X-ray photons for a period time and is then quickly switched off, the input X-ray and the detector reading does not reach a zero value immediately. Moreover, if the CT gantry speed or rotating table speed is faster than the decay rate of the solid state material, then the detector reading at each projection view is affected from the detector readings from past projection views. This, in turn, causes the azimuthal blur in the reconstruction image.

The detector PSF is typically used to access the spatial resolution of an imaging system. The detector PSF generally originates from the scintillator behavior for the incident X-ray. This results in an X-Ray spread over several detector elements, which is characterized as the detector PSF. Since the PSF is across each detector element at each incident projection view, the PSF is referred to as a view angle invariant characteristic. Mathematically, the measurement from the detector which incorporates this characteristics is denoted by:

$$y = Hx + n \tag{8}$$

where y denotes the detector reading, x is the incident X-ray intensity, n denotes the noise and H denotes the convolution operator due to the detector lag and the detector PSF. In accordance with embodiments of the present technique, the convolution operator H is composed of two separable filters in detector view and detector row directions and is indicated as follows:

$$H = h * g \tag{9}$$

where h and g denote the blur due to detector lag and detector PSF respectively.

Referring to equation (8), in accordance with the present embodiment, the detector lag and the detector PSF correction is used to obtain the ideal X-ray intensity, x from the detector reading, y by deconvolving, H. In particular, an iterative deconvolution algorithm is applied to the measured sinogram data, to optimally correct the detector PSF and detector time lag. The iterative deconvolution algorithm is formulated as a nonlinear optimization problem as will be described in greater detail below.

Referring again, to equation (8), again, the least square solution for equation (8) is obtained by the following equation:

$$\hat{x} = (H^T H)^+ H^T y = H^T (HH^T)^+ y \tag{10}$$

where the superscript, T denotes the transpose, and + is the generalized inverse. As is known by those skilled in the art, a disadvantage of the least square solution, obtained using (10) is that the above least square solution does not take into consideration, the non-negative value for the resultant estimate of the intensity $\hat{X}$. To obtain a non-negative estimate, a truncation to zero for the negative values may be computed, but such a direct inversion applied to equation (10) may result in an erroneous reconstruction. Therefore, in accordance with the present technique, a novel iterative deconvolution algorithm is applied, to the measured sinogram data. As mentioned above, the iterative deconvolution algorithm optimally corrects the detector PSF and detector time lag. Since, in general, the raw projection data should have a positive intensity, conventional deconvolution techniques that use linear filters (such as a Weiner filter, for example) are not optimal in nature. In accordance with embodiments of the present technique, the deconvolution problem is formulated as a non-linear optimization problem. The optimization problem results in an accurate deconvolution of the detector PSF and detector time lag. The optimization problem is formulated as follows:

$$\min_{x} \|y - Hx\|^2_w \tag{11}$$

subject to the constraint, $x \geq 0$ where $\|y-Hx\|^2_w = (y-Hx)^T W(y-Hx)$ denotes the weighted norm with a weighting matrix, denoted by W. Since, solving the constraint minimization problem presents certain difficulties, an unconstrained minimization problem is formulated to obtain the solution of equation (11). Further, by replacing $x=\exp(-s)$, the formulation of equation (11) becomes an unconstrained minimization problem as follows:

$$\min_{s} C(s)$$

$$C(s) = \|y - H\exp(-s)\|^2_w \tag{12}$$

wherein

It may be noted that for any real number s, the expression $x=\exp(-s)$ cannot be negative. Therefore, in accordance with the present embodiment, the optimization problem depicted in equation (12) is solved without the use of any additional constraints. Also, since the solution to s may be any real number, the optimization problem may be solved using any standard non-linear optimization method such as for example, gradient search. As will be appreciated by those skilled in the art, an optimization problem that is solved without the use of additional constraints has a low associated computational cost. In contrast, more sophisticated algorithms exist that specifically deal with constraint problems, but come with a high associated computational cost.

The embodiments illustrated and described above, provide a technique for reconstructing image data acquired from an imaging system. The beam hardening correction technique described above may be used for a plurality of materials without any tedious and expensive calibration procedures and provides a very accurate correction when combined with detector PSF and detector time lag correction. In addition, the proposed PSF and time lag correction technique, though iterative in nature, has negligible computational complexity as compared to iterative reconstruction techniques, since the iteration is performed in the measurement domain without resorting to computationally expensive forward and backprojections. For example, if 5~15 iterations are needed to get a reconstruction image by using a certain iterative reconstruction technique, 5~15 times the number of forward and backprojections would typically need to be performed. Assuming that the time required for one backprojection is $T_{bp}$ and forward projection costs the same as backprojection, the total time needed for reconstruction will be 10~30 $T_{bp}$ using an iterative reconstruction method. On the contrary, the pre-correction step performed in accordance with the present technique, requires one correction step and one back projection step to be performed. Therefore, the total computation time is equal to $T_{bp}$+ pre-correction time. In view of the fact that the pre-correction time is known to be smaller than $T_{bp}$, the total computation time for pre-correction is lesser than twice the value of $T_{bp}$, which is a considerable improvement over the existing iterative reconstruction techniques. Furthermore, the resultant reconstructed CT image with pre-correction in accordance with the present technique achieves high image quality with minimal increments to computational time as compared to conventional filtered backprojection techniques.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method for reconstructing image data from measured sinogram data acquired from a Computed Tomography (CT) system, the method comprising:
    pre-processing the measured sinogram data, wherein the pre-processing comprises performing a beam hardening correction on the measured sinogram data and performing a detector point spread function (PSF) correction and a detector lag correction on the measured sinogram data; and
    reconstructing the pre-processed sinogram data to generate the image data,
    wherein the CT system is configured for industrial imaging, wherein performing the beam hardening correction on the measured sinogram data comprises:
    computing a detector efficiency curve associated with the CT system,
    scaling an X-ray source spectrum by the detector efficiency curve to obtain a corrected X-ray source spectrum,
    determining an attenuation coefficient value for each material traversed by at least one X-ray, at one or more X-ray energy levels, and
    analytically deriving a beam hardening correction curve based on the attenuation coefficient value at the one or more X-ray energy levels and the corrected X-ray source spectrum.

2. The method of claim 1, wherein the CT system is configured to use a plurality of high energy polychromatic X-rays.

3. The method of claim 1 wherein the attenuation coefficient value at the one or more X-ray energy levels is pre-computed based upon a material composition and an X-ray source profile.

4. The method of claim 1, wherein analytically deriving the beam hardening correction curve further comprises analytically deriving an attenuation value resulting from beam hardening for an X-ray path length, based on a summation of one or more intensity values over the one or more X-ray energy levels, wherein each X-ray energy level has a corresponding attenuation coefficient value.

5. The method of claim 4, wherein the beam hardening correction curve is analytically derived based on the attenuation value resulting from beam hardening and a linearized projection for the X-ray path length.

6. The method of claim 1, further comprising performing an optimization of the beam hardening correction curve based on one or more tuning parameters.

7. The method of claim 6, wherein the tuning parameters comprise at least one of an X-ray energy level, an X-ray spectrum energy bin number and a path length discretization number.

8. The method of claim 1, wherein performing the detector PSF correction and the detector lag correction comprises deconvolving the measured sinogram data along one or more detector rows and detector view directions.

9. The method of claim 1, wherein the pre-processed sinogram data is filtered and backprojected to generate reconstructed image data.

10. A method for reconstructing image data from measured sinogram data acquired from a Computed Tomoaraphv (CT) system, the method comprising:
pre-processing the measured sinogram data, wherein the pre-processing comprises performing a beam hardening correction on the measured sinogram data and performing a detector point spread function (PSF) correction and a detector lag correction on the measured sinogram data; and
reconstructing the pre-processed sinogram data to generate the image data,
wherein the CT system is configured for industrial imaging,
wherein performing the detector PSF correction and detector lag correction comprises deconvolving the measured sinogram data along one or more detector rows and detector view directions and applying an iterative deconvolution algorithm to the measured sinogram data.

11. The method of claim 10, wherein the iterative deconvolution algorithm is formulated as a nonlinear optimization problem.

12. A method for reconstructing image data from measured sinogram data acquired from a Computed Tomography (CT) system, the method comprising:
pre-processing the sinogram data, wherein the pre-processing comprises performing a detector point spread function (PSF) correction and a detector lag correction on the measured sinogram data, and wherein the detector PSF correction and the detector lag correction comprises deconvolving the measured sinogram data along one or more detector rows and detector view directions; and
reconstructing the pre-processed sinogram data to generate the image data, wherein the CT system is adapted for industrial imaging, wherein performing the detector PSF correction and the detector lag correction further comprises applying an iterative deconvolution algorithm to the measured sinogram data.

13. The method of claim 12, wherein the iterative deconvolution algorithm is formulated as a nonlinear optimization problem.

14. The method of claim 12, wherein the pre-processed sinogram data is filtered and backprojected to generate reconstructed image data.

15. A computed tomography (CT) system for reconstructing image data from measured sinogram data, the computed tomography system comprising:
an X-ray source configured to project a plurality of polychromatic X-ray beams through an object;
a detector configured to produce a plurality of electrical signals in response to a plurality of X-ray beams received from the source; and
a system controller configured to process the plurality of electrical signals to generate the measured sinogram data, wherein the system controller is further configured to pre-process the measured sinogram data to perform a beam hardening correction on the measured sinogram data, wherein the system controller is further configured to perform a detector point spread function (PSF) correction and a detector lag correction on the measured sinogram data and wherein the system controller is further configured to reconstruct the pre-processed sinogram data to generate the image data, wherein the CT system is adapted for industrial imaging, wherein the system controller is configured to perform the beam hardening correction on the measured sinogram data based on:
computing a detector efficiency curve associated with the CT system;
scaling an X-ray source by the detector efficiency curve to obtain a corrected X-ray source spectrum;
determining an attenuation coefficient value for each material traversed by at least one X-ray, at one or more X-ray energy levels; and
analytically deriving a beam hardening correction curve based on the attenuation coefficient value at the one or more X-ray energy levels and the corrected X-ray source spectrum.

16. The computed tomography system of claim 15, wherein the X-ray source is configured to project a plurality of high energy polychromatic X-rays.

17. The computed tomography system of claim 15, wherein the system controller is configured to pre-compute the attenuation coefficient value at the one or more X-ray energy levels based upon a material composition and an X-ray source profile.

18. The computed tomography system of claim 15, wherein the system controller is configured to analytically derive an attenuation value resulting from beam hardening for an X-ray path length based on a summation of one or more intensity values over the one or more X-ray energy levels, wherein each X-ray energy level has a corresponding attenuation coefficient value.

19. The computed tomography system of claim 18, wherein the beam hardening correction curve is analytically derived based on the attenuation value resulting from beam hardening and a linearized projection for the X-ray path length.

20. The computed tomography system of claim 15, wherein the system controller is further configured to perform an optimization of the beam hardening correction curve based on one or more tuning parameters.

21. computed tomography system for reconstructing image data from measured sinogram data, the computed tomography system comprising:
an X-ray source configured to project a plurality of polychromatic X-ray beams through an object;
a detector configured to produce a plurality of electrical signals in response to a plurality of X-ray beams received from the source; and
a system controller configured to process the plurality of electrical signals to generate the measured sinogram data, wherein the system controller is further configured to pre-process the measured sinogram data to perform a beam hardening correction on the measured sinogram data, wherein the system controller is further configured to perform a detector point spread function (PSF) correction and a detector lag correction on the measured sinogram data and wherein the system controller is further configured to reconstruct the pre-processed sinogram data to generate the image data, wherein the CT system is adapted for industrial imaging, and wherein the system controller is configured to perform the detector PSF correction and the detector lag correction by a deconvolution of the measured sinogram data along one or more detector rows and detector view directions.

22. A computed tomography system for reconstructing image data from measured sinogram data, the computed tomography system comprising:
  an X-ray source configured to project a plurality of polychromatic X-ray beams through an object;
  a detector configured to produce a plurality of electrical signals in response to a plurality of X-ray beams received from the source; and
  a system controller configured to process the plurality of electrical signals to generate the measured sinogram data, wherein the system controller is further configured to pre-process the measured sinogram data to perform a beam hardening correction on the measured sinogram data, wherein the system controller is further configured to perform a detector point spread function (PSF) correction and a detector lag correction on the measured sinogram data and wherein the system controller is further configured to reconstruct the pre-processed sinogram data to generate the image data, wherein the CT system is adapted for industrial imaging, wherein the system controller is configured to perform the detector PSF correction and detector lag correction by a deconvolution of the measured sinogram data along one or more detector rows and detector view directions and by applying an iterative deconvolution algorithm to the measured sinogram data, wherein the iterative deconvolution algorithm is formulated as a nonlinear optimization problem.

* * * * *